United States Patent
Pattillo, Jr.

(10) Patent No.: US 12,413,058 B2
(45) Date of Patent: Sep. 9, 2025

(54) ELECTRICAL ENCLOSURE FOR PROTECTION OF CABLE JUNCTIONS DURING A FIRE EMERGENCY

(71) Applicant: Conquest Firespray LLC, Warren, MI (US)

(72) Inventor: John A. Pattillo, Jr., Clarksville, MD (US)

(73) Assignee: CONQUEST FIRESPRAY LLC, Warren, MI (US)

( * ) Notice: Subject to any disclaimer, the term of this patent is extended or adjusted under 35 U.S.C. 154(b) by 239 days.

(21) Appl. No.: 18/201,687

(22) Filed: May 24, 2023

(65) Prior Publication Data

US 2023/0402826 A1  Dec. 14, 2023

Related U.S. Application Data

(60) Provisional application No. 63/345,415, filed on May 24, 2022.

(51) Int. Cl.
  *H02G 3/14* (2006.01)
  *H02G 3/08* (2006.01)

(52) U.S. Cl.
  CPC ............. *H02G 3/088* (2013.01); *H02G 3/081* (2013.01); *H02G 3/14* (2013.01)

(58) Field of Classification Search
  CPC ...... H02G 3/0412; H02G 3/088; H02G 3/081; H02G 3/14
  USPC ........................................................ 174/500
  See application file for complete search history.

(56) References Cited

U.S. PATENT DOCUMENTS

| | | | | |
|---|---|---|---|---|
| 3,559,594 A | * | 2/1971 | Miller | E05G 1/024 220/592.26 |
| 3,709,169 A | * | 1/1973 | Gauger, Jr. | E05G 1/024 109/80 |
| 3,888,557 A | * | 6/1975 | Anderson | G11B 23/021 312/409 |
| 5,069,358 A | * | 12/1991 | Avery, Jr. | G11B 33/04 29/469 |
| 2001/0048985 A1 | * | 12/2001 | Legare | E05G 1/024 428/34.4 |
| 2011/0094423 A1 | * | 4/2011 | DelloRusso, Jr. | E05G 1/024 109/76 |
| 2015/0054397 A1 | * | 2/2015 | Weiler | B61D 49/00 312/409 |

(Continued)

*Primary Examiner* — Timothy J Thompson
*Assistant Examiner* — Michael F McAllister
(74) *Attorney, Agent, or Firm* — Squire Patton Boggs US LLP

(57) ABSTRACT

A fire-resistant enclosure to protect junctions between fire resistant cables against fire, heat, and water damage during a fire emergency. The enclosure includes a metal case with walls containing layers of fire-resistant materials including fibrous mineral insulation coated with cement-based fire-resistant material, sealed with intumescent material. The enclosure includes a cabinet with sleeved penetrations through which the fire resistant cables enter the enclosure; the sleeved penetrations facilitate sealing and fire stopping around the fire resistant cables. The enclosure includes a removable lid allowing installation and maintenance of junctions within the enclosure; the structure facilitates sealing and fire stopping between the cabinet and the lid. The invention also includes a method of fabrication and a method of use.

20 Claims, 12 Drawing Sheets

(56) References Cited

U.S. PATENT DOCUMENTS

2018/0294630 A1* 10/2018 Aycock .................. H02B 1/36

* cited by examiner

- 45a — form cabinet case with cabinet inner and outer shells and form a lid case with lid inner and outer shells by cutting, bending, riveting, and welding
- 45b — form at least one aperture in the cabinet case through the cabinet cabinet shell and through the cabinet outer shell
- 45c — seal seams in the cabinet case and the lid case with intumescent sealant
- 45d — coat fibrous mineral insulation with cement-based fire-resistant material to form fire-resistant layer
- 45f — form at least one aperture in the fire-resistant layer
- 45g — cut fire-resistant block to fit the aperture in the fire-resistant layer
- 45h — form at least one aperture in the fire-resistant block
- 45i — place at least one fire-resistant layer to cover the external surface of the cabinet inner shell and adhere with thixotropic sealant, with the aperture in the fire-resistant layer aligned with the aperture in the cabinet inner shell
- 45j — seal edges of the fire-resistant layer with thixotropic sealant
- 45k — place cabinet outer shell over the fire-resistant layer(s), with the aperture in the cabinet outer shell aligned with the aperture in the fire-resistant layer
- 45m — weld the cabinet outer shell to the cabinet inner shell
- 45n — weld conduit to the cabinet outer shell so that the conduit extends a short distance outside the metal case
- 45p — seal seams in the cabinet case and between the cabinet case and the conduit with intumescent sealant
- 45q — form at least one lid fire-resistant layer by coating fibrous mineral insulation with cement-based fire-resistant material
- 45s — seal the edges of the lid fire-resistant layer with thixotropic sealant
- 45t — place at least one lid fire-resistant layer to cover the external surface of the lid inner shell and adhere with thixotropic sealant
- 45u — place lid outer shell over the lid fire-resistant layer(s)
- 45v — weld the lid outer shell to the lid inner shell to form a lid
- 45w — use fasteners to removably secure the lid and the cabinet, and seal joints and seams with intumescent sealant to form a fire-resistant enclosure.

FIG. 8

| | |
|---|---|
| 47a | provide a fire-resistant enclosure with a cabinet, a lid, and a sleeved penetration |
| 47b | apply intumescent tape to a portion of fire-resistant cable that will pass through the sleeved penetration |
| 47c | pass fire-resistant cable through the sleeved penetration and form at least one junction with the fire-resistant cable within the cabinet using junction elements |
| 47d | seal between the sleeved penetration and the fire-resistant cable with intumescent sealing putty |
| 47e | apply fiber gasket and intumescent tape gasket where the lid and the cabinet meet, and removably secure the lid and the cabinet with fasteners to form a fire-resistant enclosure |

FIG. 9

ELECTRICAL ENCLOSURE FOR PROTECTION OF CABLE JUNCTIONS DURING A FIRE EMERGENCY

RELATED APPLICATIONS

This application claims the benefit of U.S. Provisional Application No. 63/345,415, filed on May 24, 2022, which application(s) are incorporated herein by reference in their entirety.

FIELD OF THE INVENTION

An apparatus for protecting electrical or communication elements from fire is disclosed. In particular, the apparatus can be utilized to protect junctions of electrical or communication cables and maintain communication during a fire emergency. The apparatus is particularly applicable to electrical or communication cables that are "Fire Rated" cables (FR cables). Methods of fabrication and use are also disclosed.

BACKGROUND ART

In a fire emergency, heat from a fire can interrupt critical instrumentation, monitoring, control, suppression, data, or communication signals key to addressing the emergency. While there are fire-resistant cables for such critical signals, junctions between such cables are particularly susceptible to the high heat that may be present during a fire emergency, which can interrupt critical RF signal transmission, for example.

Materials that can be used to provide some fire resistance include those disclosed in U.S. Pat. No. 11,066,603 and U.S. Patent Application Pub. No. 2022/0010210. Fire-resistant cables include those manufactured by Radio Frequency Systems and any other FR cable manufacturer as are available from various distributors.

The present invention provides improvements that address limitations associated with the prior art.

BRIEF SUMMARY OF THE INVENTION

The present invention preferably includes a fire-resistant electrical enclosure that can be used for protection of junctions between cables and the like to maintain communication integrity during a fire emergency. In preferred embodiments the electrical enclosure includes layers of fire-resistant materials arranged within the walls of the fire-resistant electrical enclosure, including a fire-resistant material applied as a coating to specific portions of a fire-resistive sheathing. Fire-resistant sealing materials are used to retain moisture that may be released from elements of the structure to enhance the fire-protection of communication cable junctions and the like that are protected within the electrical enclosure. The electrical enclosure preferably includes a cabinet and a lid that are removably attached to each other to allow the electrical enclosure to be opened for maintenance or modification of junction components and can be subsequently closed in a manner that maintains the fire-resistance of the electrical enclosure. The electrical enclosure includes at least one sleeved penetration that provides for passage of one or more cables into the enclosure, and cable junctions and the like within the electrical enclosure are protected to maintain communication during a fire emergency.

The invention also includes a method of fabricating a fire-resistant electrical enclosure. The invention also includes a method of protecting cable junctions during a fire emergency.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described preferred embodiments of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include parts corresponding to the parts in the previously described embodiment;

FIG. 8 is a chart illustrating manufacturing steps in a preferred method of fabricating the electrical enclosure of FIG. 1; and FIG. 9 is chart illustrating steps in a preferred method of use of the electrical enclosure of FIG. 1.

DETAILED DESCRIPTION OF THE INVENTION

In a fire emergency, it is important to maintain operation of certain key systems and equipment in order to mitigate the effects of the fire, monitor the situation, ensure operation of fire suppression systems or safety systems, coordinate the response or evacuation, or maintain operation of critical equipment. One key aspect is maintenance of communication during a fire emergency, whether the communication is between various personnel, between critical pieces of equipment, or communication between personnel and critical equipment. In a fire emergency, the elevated temperatures that may be present can damage the cables and connectors used in communication systems, such as RF (radio-frequency) electrical signal transmission cables used to communicate key voice, image, or data between emergency or other personnel, or monitoring equipment, alarm systems, fire-suppression systems, door or ventilation controls, and other equipment. There are various regulatory and standards organizations that have issued requirements or standards for fire or temperature resistance and durations of exposure for such communication systems and related equipment. It has been difficult to produce communication cabling systems that achieve ratings or otherwise meet the standards for such situations. Fire-resistant cables are available, such as the DragonSkin cables (Radio Frequency Systems, Meriden, CT) for such communication. However, other elements of such communication systems, such as cable junctions, connectors, splitters, joints, terminal points, and the like, as well as connected equipment and their connections to the communication cables, often cannot withstand the high temperature situations anticipated during a fire emergency. For example, the materials that form parts of those elements may not be able to withstand the high temperatures. Some of those elements may themselves withstand high temperatures, such as elements made of certain metals, the associated terminals and junctions may transmit heat (such as via highly thermally conductive metal components) to other elements in close proximity, resulting in high temperatures reaching such more-susceptible elements and causing potential failures. In particular, the junctions between fire-resistant communication cables require protection against damage during a fire that could otherwise impair the transmission of signals during a fire emergency. There is need for improved fire-resistant enclosures to protect cable junctions during a fire and maintain critical communication systems. In addition, there is need for such enclosures that can meet regulatory and standards organization specifications for fire resistance. The enclosure disclosed herein can be used to limit temperature within the enclosure and heat transfer to components housed within, and as a result, improve reliability within these systems.

Figure 1:
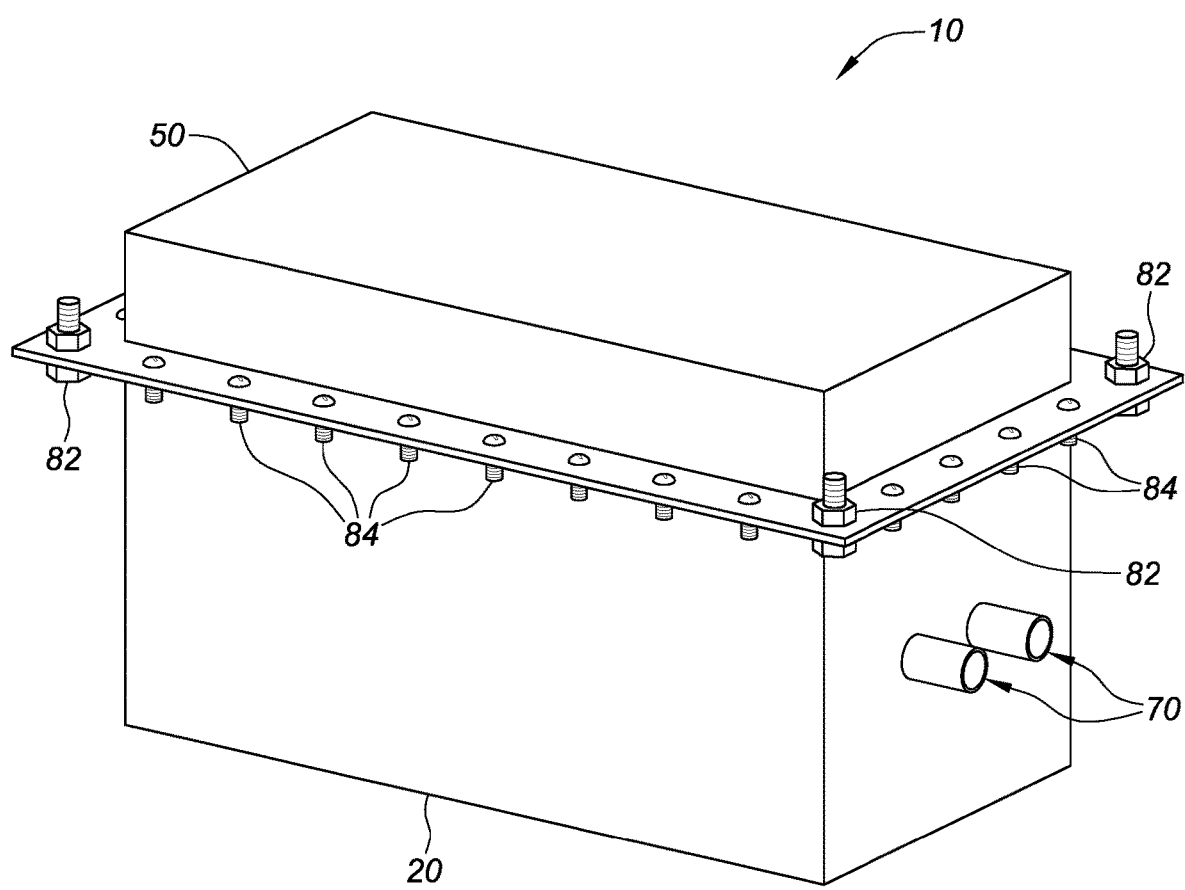
FIG. 1 is a perspective view of an electrical enclosure of the present invention, showing the cabinet and the lid and sleeved penetrations.
Figure 2:
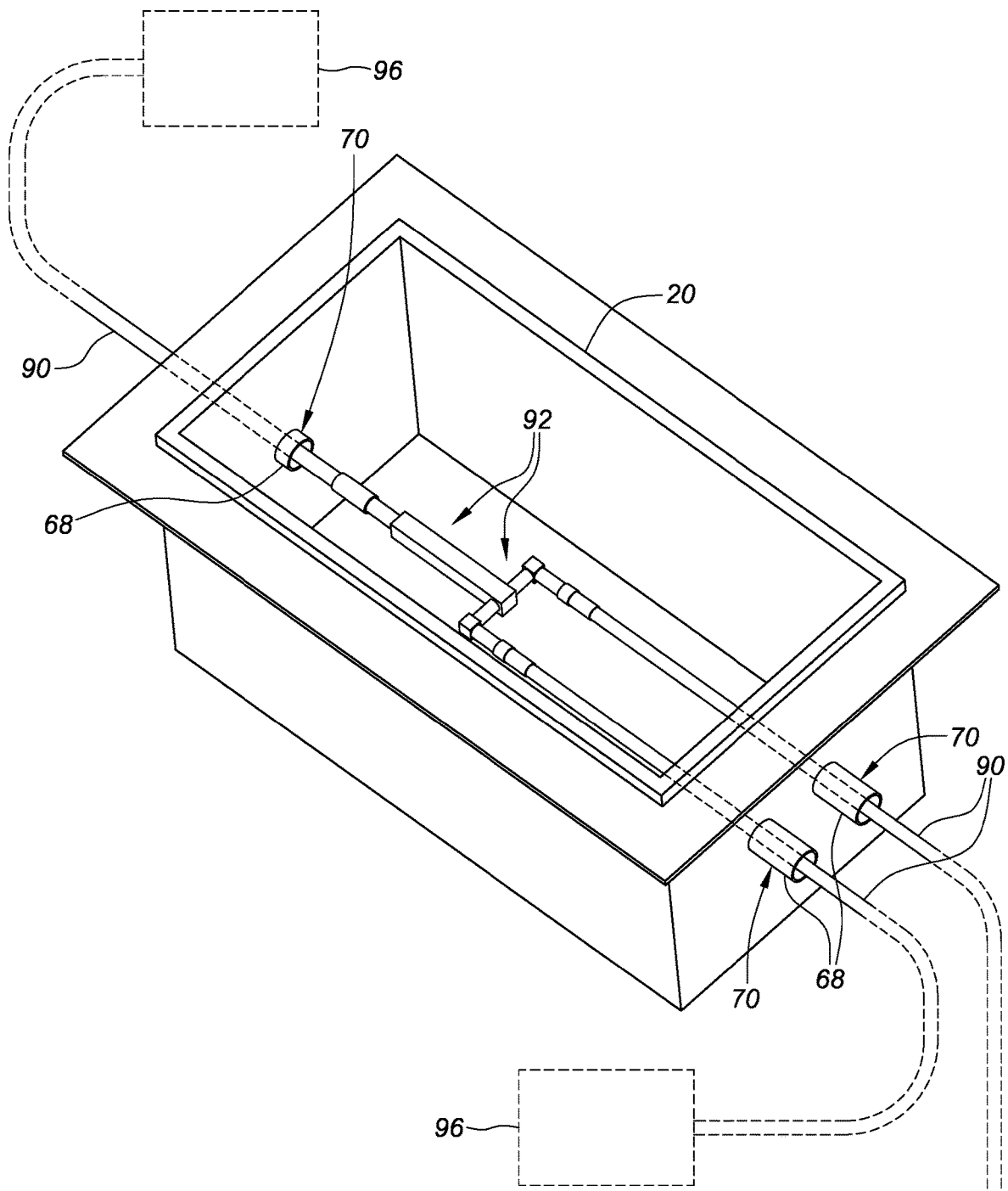
FIG. 2 is a perspective illustration of the cabinet of the electrical enclosure of FIG. 1 from above, with cables inserted through the sleeved penetration and showing cable junctions within the interior of the cabinet and showing connected equipment in phantom.

Referring now to the drawings, the present invention includes an electrical enclosure 10, illustrated in FIG. 1, that is fire-resistant and can be used for protection of junctions between cables to maintain communication integrity during a fire emergency. The electrical enclosure 10 preferably includes a cabinet 20, a lid 50, and sleeved penetrations 70. Shown in FIG. 2 are cables 90 that pass into the electrical enclosure 10 via the sleeved penetrations 70. Equipment 96, between which communication is essential during a fire emergency, are indicated schematically on FIG. 2 in phantom. The equipment 96 can, for example, include voice or image communication devices, monitoring or status indicators, fire suppression devices, door, elevator or venting controls, and so forth. Communication between such equipment, whether for communication between personnel, between critical pieces of equipment, or communication between personnel and critical equipment, typically includes electrical signals such as RF signals that are transmitted along the cables 90. Whether to facilitate construction, assembly, modification, or maintenance of such communication systems, or provide for communication between more than 2 pieces of equipment, a plurality of cables 90, joined by one or more cable junctions 92, are desired. Also shown in FIG. 2 are the cable junctions 92 between the cables 90; the cable junctions 92 are protected from fire damage by the electrical enclosure 10. The cables 90 are preferably fire-resistant cables such as DragonSkin cables (Radio Frequency Systems, Meriden, CT), which have a structure that provides a degree of fire protection. However, cable junctions 92 made between such fire-resistant cables 90 typically do not provide the desired degree of fire protection due to the materials and structures used for these cable junctions 92. By locating the cable junctions 92 within the electrical enclosure 10, the cable junctions 92 are provided enhanced fire protection.

The electrical enclosure 10 is illustrated with the lid 50 removed from the cabinet 20 in FIG. 2, to illustrate the cables 90 which pass into the electrical enclosure 10 through the sleeved penetrations 70, and the cable junctions 92 that are located within the electrical enclosure 10. In particular applications, 2, 3, 4, or more cables 90 can be joined for communication by 1 or more cable junctions 92, that are protected against fire damage by being located within 1 or more electrical enclosures 10. Similarly, the electrical enclosure 10 includes 2, 3, 4, or more sleeved penetrations 70 to allow for passage of the cables 90 into the electrical enclosure 10. The sleeved penetrations 70 preferably allow for passage of cables 90 that are up to about 0.75 inch diameter. If it is convenient to do so, switching devices or other equipment can be located within the electrical enclosure 10, with any required cable junctions 92 being protected within the electrical enclosure 10 as well. The electrical enclosure 10 includes 1 or more sleeved penetration 70; preferably, the electrical enclosure 10 includes 2 or more sleeved penetrations 70. More preferably, the electrical enclosure 10 includes 3 or more sleeved penetrations 70. The cable junctions 92 can utilize various junction elements such as splitters, connectors, and terminals as needed. Any unused sleeved penetrations 70, such as when only two cables 90 are joined within an electrical enclosure 10, but the electrical enclosure 10 has three or more sleeved penetrations, the unused sleeved penetrations 70 are preferably plugged by a fire-resistant penetration plug. For example, the intumescent sealing putty 74 can be used to create an effective plug of any unused sleeved penetrations 70.

Figure 3:
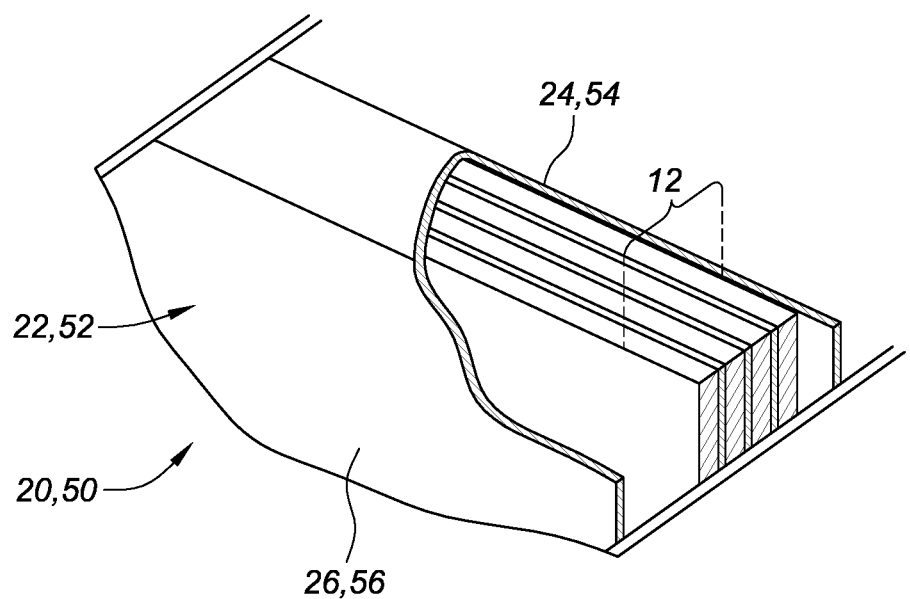
FIG. 3 is a schematic breakaway view illustrating the layered structure of the cabinet and the lid of the electrical enclosure of FIG. 1.
Figure 4A:
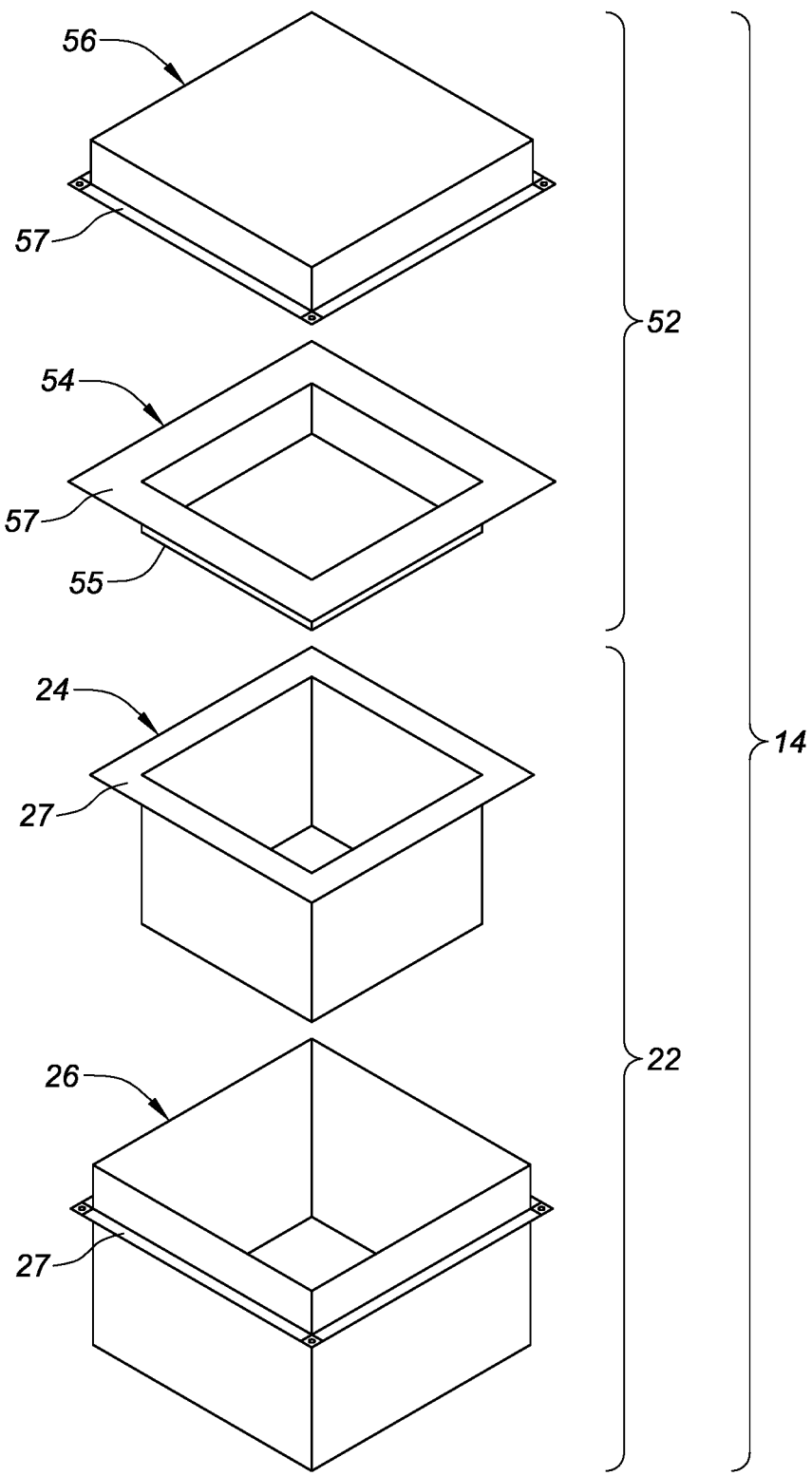
FIG. 4A is an exploded perspective illustration of a case of the electrical enclosure of FIG. 1, including a cabinet outer shell, a cabinet inner shell, a lid outer shell, and a lid inner shell.

The electrical enclosure 10 incorporates a fire-resistant case 14 (FIG. 4A) and a layered structure 12 for the cabinet 20 and the lid 50 in order to provide the degree of fire and heat protection required to protect the cable junctions 92. The fire-resistant case 14 preferably includes a fire-resistant cabinet case 22 and a fire-resistant lid case 52. A schematic illustration of the layered structure 12 of the cabinet 20 and the lid 50 is shown in FIG. 3. The layered structure 12 of the cabinet 20 preferably includes a fire-resistant cabinet case 22 (FIG. 4A) including a cabinet inner shell 24 and a cabinet outer shell 26 and a plurality of layers such as heat-resistive or fire-resistant layer or fire-resistive layer 34, fibrous insulation 30, cement-based fire-resistant material 32, fire-resistant or fire-resistive block 36, mineral board 38, fire-resistant or fire-resistive panel 40, fire-resistant or fire-resistive sheathing 42 such as those disclosed herein. The layered structure 12 more preferably includes the cabinet inner shell 24, a plurality of fire-resistive layers 34 each including fire-resistive sheathing 42 with a coating of cement-based fire-resistant material 32 on the outer surface, and a cabinet outer shell 26. The cabinet inner shell 24 and the cabinet outer shell 26 preferably comprise a material that can withstand temperatures anticipated during a fire emergency, such as metal, ceramic, carbon fiber, and composites. More preferably, the cabinet inner shell 24 and the cabinet outer shell 26 comprise metal; still more preferably, the cabinet inner shell 24 and the cabinet outer shell 26 comprise a corrosion-resistant steel. During fabrication of the cabinet 20, the cabinet inner shell 24 and a cabinet outer shell 26 meet at cabinet flange 27, at which location the cabinet inner shell 24 and a cabinet outer shell 26 are secured, such as by spot welding, riveting, or adhering, and the joint or seam is preferably sealed with intumescent acrylic sealant 44b. Additional fire-resistive materials (such as mineral board 38 or fire-resistant panel 40, described below) may be added inside the cabinet outer shell 26 or inside the cabinet inner shell 24. The layered structure 12 of the lid 50 is preferably similar to that of the cabinet 50, and preferably includes a lid case 52 (FIG. 4A) including a lid inner shell 54 and a lid outer shell 56 and a plurality of layers such as fire-resistive layer 34, fibrous insulation 30, cement-based fire-resistant material 32, fire-resistive block 36, mineral board 38, fire-resistive panel 40, fire-resistive sheathing 42 such as those disclosed herein. The layered structure 12 more preferably includes the lid inner shell 54, a plurality of fire-resistive layers 34 each including fire-resistive sheathing 42 with a coating of cement-based fire-resistant material 32 on the outer surface, and a lid outer shell 56. During fabrication of the lid 50, the lid inner shell 54 and a lid outer shell 56 meet at lid flange 57, at which location the lid inner shell 54 and a lid outer shell 56 are secured, such as by spot welding, riveting, or adhering, and the joint or seam is preferably sealed with intumescent acrylic sealant 44b. The lid inner shell 54 preferably extends to form a plug extension 55, which, when the lid 50 and the cabinet 20 are assembled, fits a distance into the cabinet 20. The cabinet case 22 is preferably constructed of a sturdy steel material, such as of 22-gauge galvanized sheet metal, and any seams welded to maintain thermal integrity, such as spot welds with spacing of about 1.5 inches.

The electrical enclosure 10 is preferably a rectangular structure, with the cabinet 20 having 5 walls including 4 sides and a bottom, and the lid 50 being the top of the enclosure. Similarly, the cabinet case 22, the cabinet inner shell 24, and the cabinet outer shell 26 preferably include corresponding walls, sides, and bottom. In other embodiments, the cabinet 20 can have 3-8 sides, for example, with the cabinet case 22, the cabinet inner shell 24, the cabinet outer shell 26, and the lid 50 having corresponding shape.

Figure 4B:
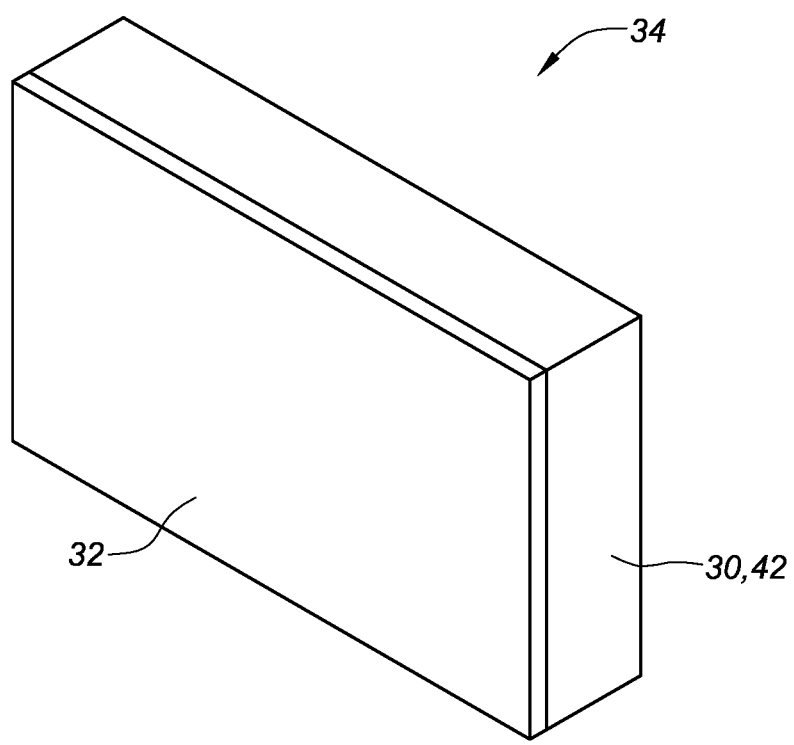
FIG. 4B is a schematic illustration of a combination fire-resistive layer of the electrical enclosure of FIG. 1.

The fire-resistive layers 34 are further illustrated in FIG. 4B, and preferably include a fire-resistive sheathing 42, such as a mineral wool board or other fibrous or porous fire-resistive insulation 30, with a mineral-based or cement-based fire-resistant material 32 applied to the mineral wool board. In preferred embodiments, the fire-resistive sheathing 42 is a mineral wool board, such as 2-inch thick Comfortboard 80 rock wool board (Rockwool, Milton, Ontario, CA available in various thicknesses from many dealers), with cement-based fire-resistant material 32, such as Flamebar BW18 (Firespray International Limited, Harlow, Essex, UK) applied to one side of the rock wool board. In some embodiments, the mineral-based or cement-based fire-resistant material 32 is applied by spraying, brushing, or pouring onto the fire-resistive insulation 30. In other embodiments, a layer of mineral-based or cement-based fire-resistant material 32 is formed and subsequently adhered to the fire-resistive insulation 30. Preferably, the cement-based fire-resistant material is applied, screeded, and cured and results in a layer about $1/8$ to $5/16$ inch thick after curing; more preferably, the cured cement-based fire-resistant material is about $1/4$ inch thick. When assembled to form a portion of the layered structure of the cabinet 20 and the lid 50, the cement-based fire-resistant material 32 is preferably oriented towards the external aspect of the electrical enclosure 10.

Figure 4C:
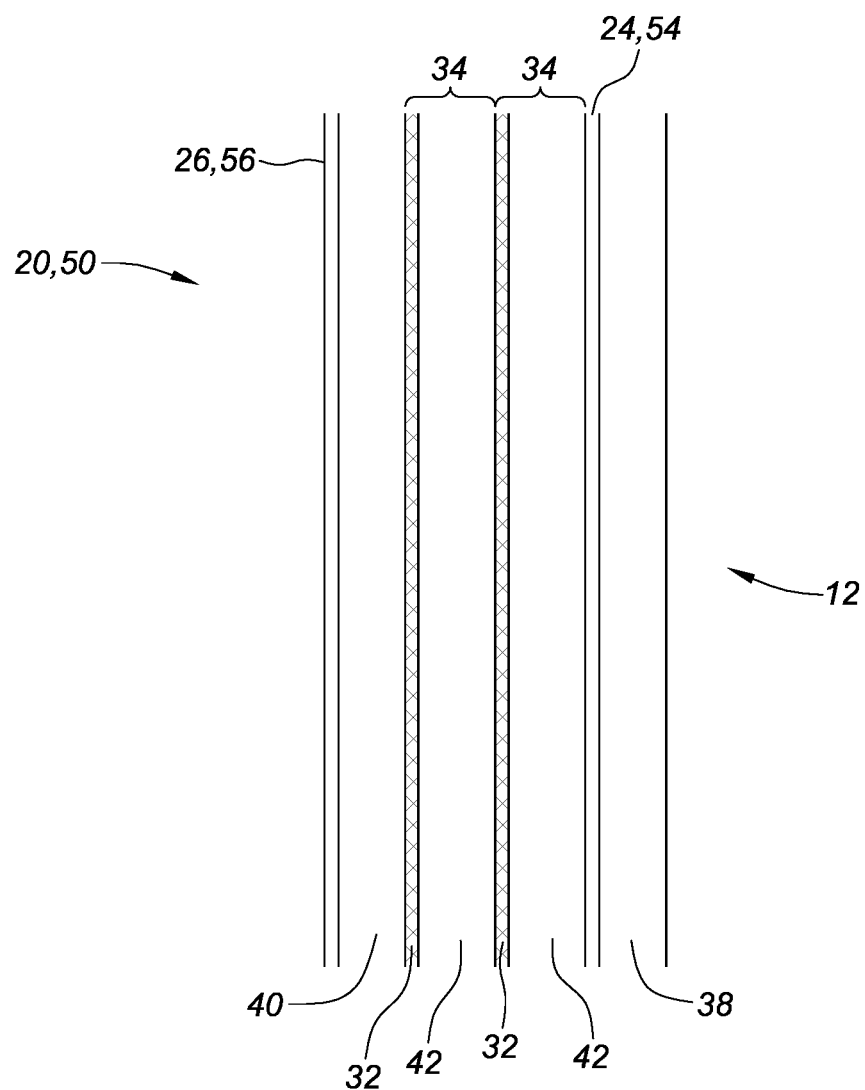
FIG. 4C is a detailed view illustrating an example of the layered structure of the electrical enclosure of FIG. 1 schematically illustrated in FIG. 3.

The layered structure of the electrical enclosure 10 is further shown in detail in FIG. 4C. The basic layered structure 12 of the cabinet 20 and the lid 50 are preferably similar, although the materials and dimensions of the layers can be varied for particular applications. The layered structure 12 of the cabinet 20 and the lid 50 preferably include a cabinet inner shell 24, a fire-resistive layer 34 including a fire-resistive sheathing 42 with cement-based fire-resistant material 32 applied on the external aspect, a second fire-resistive layer 34 with cement-based fire-resistant material 32 applied on the external aspect, a fire-resistive panel 40, and a cabinet outer shell 26. A layer of mineral board 38 is preferably applied to the inside of the cabinet inner shell 24. The layered structure 12 of the lid 50 is preferably similar, including a lid inner shell 54, a fire-resistive layer 34, a second fire-resistive layer 34, a fire-resistive panel 40, and a lid outer shell 56, with a layer of mineral board 38 applied to the inside of the lid inner shell 54. The mineral board is preferably a fire-resistant mineral board, and more preferably $5/8$ inch type X gypsum wallboard, such as Sheetrock® Brand EcoSmart Panels Firecode® X UL Type ULIX™ (USG, Chicago, IL).

The fire-resistive panel 40 is preferably a rigid microporous mineral core enveloped in non-combustible cloth such as a glass cloth; suitable fire-resistive panel 40 preferably about 20 mm thick (Morgan Advanced Materials, Windsor, UK). The fire-resistive panel 40 is preferably the outermost layer inside the cabinet outer shell 24 and the lid outer shell 56 the layered structure 12 of the cabinet 20 and the lid 50. The fire-resistive panel 40 is preferably chosen for high temperature resistance, since this outer layer can be exposed to a 1850° F. temperature during a fire emergency.

The layered structure 12 of the cabinet 20 and the lid 50 preferably include a material that releases water or steam during a high temperature event, such as the mineral board 38; such material can, for example, be gypsum-based materials such as drywall, drywall liner panels, or liquid gypsum. In general, the layered structure 12 preferably includes an endothermic material that further protects the interior of the electrical enclosure 10 from high temperatures. Such endothermic material can include the cement-based fire-resistant material 32. The cement-based fire-resistant material 32 is preferably located just inside the fire-resistive panel 40, and preferably releases steam when exposed to high temperatures such as about 500° F. The released steam helps dampen the heat transfer from the outside of the electrical enclosure 10 through the wall structure 12. The fibrous insulation 30 of the fire-resistive layer 34 further resists heat transfer through the wall structure 12. Preferably, a second fire-resistive layer 34 is located in the wall structure 12, again with cement-based fire-resistant material 32 oriented towards the outside of the wall structure 12, to further resist heat transfer through the wall structure 12 and release further steam from this cement-based fire-resistant material 32 of the second fire-resistive layer 34. The cement-based fire-resistant material 32 also helps to retain the released steam in order to magnify the protective effect of the released steam. The wall structure 12 provides reduced heat transfer into the interior of the electrical enclosure 10, to preferably maintain a temperature of about 120° C. for protection of the cables 90, and cable junctions 92 and other components protected within the electrical enclosure during a fire emergency. The layer of mineral board 38 preferably located inside the cabinet inner shell 24 and the lid inner shell 54 aids in further reducing the temperature inside the electrical enclosure 10 in order to maintain an acceptable temperature inside the electrical enclosure 10 during a fire emergency. Preferably, the electrical enclosure 10, with the wall structure as described herein, maintains such safe temperature (preferably no greater than 120° C.) inside the electrical enclosure 10 for at least 2 hours of exposure in a fire emergency. The amount of endothermic material that releases steam is preferably chosen so that expansion due to the steam does not affect the integrity of the case 14, and to minimize the effect of superheating the steam within the electrical enclosure 10.

In order to better utilize the release of water or steam within the layered structure 12 of the cabinet 20 and the lid 50, the fire-resistive layers 34 are preferably sealed to contain the released steam or water vapor within the electrical enclosure 10. For example, the cement-based fire-resistant material 32, is preferably positioned and utilized to seal the fire-resistive layers 32, providing a barrier to escape of the water vapor and enhance the fire-resistance of the electrical enclosure 10 and aid in maintaining a lower temperature in the interior of the electrical enclosure 10 to protect the cable junctions, cables, connectors, splitters, joints, terminal points and the like during a fire emergency. Preferably, the fire-resistive layers 34 are oriented so that the cement-based fire-resistant material 32 is covering the outer surface and the ends of the fire-resistive layers 34. Preferably, the inner surface (that is towards the inside of the electrical enclosure 10) is fibrous insulation 30 such as fire-resistive sheathing 42 that is free from any coating of cement-based fire-resistant material 32. The exposed ends of the fire-resistive layers 34 are preferably sealed with thixotropic sealant 44a in order to keep released stem within the fibrous insulation 30 of the fire-resistive layer 34. The wall structure 12 is preferably arranged so that released steam is separated from the outside of the electrical enclosure 10 where it could The electrical enclosure 10 may expand in a high-temperature situation such as may be present in a fire emergency. The use of intumescent materials such as the intumescent acrylic sealant 44b, intumescent sealing putty 74, intumescent tape gasket 88, and protective covering 94, is preferable to maintain effective sealing of the various layers and structures of the electrical enclosure 10 during such fire emergency.

Apertures 66 are formed in the cabinet inner shell 24 and the cabinet outer shell 26 to accommodate the sleeved penetrations 70. Metal conduits 68 are located at the apertures 66 in the cabinet inner shell 24 and extend from the cabinet inner shell 24 into the interior of the electrical enclosure 10, and are welded to the cabinet inner shell 24 to secure the conduits 68 in place (FIG. 2). Metal conduits 68 are also located at the apertures 66 in the cabinet outer shell 26 and extend from the cabinet outer shell 26 outward, are preferably welded to the cabinet outer shell 26. The metal conduits 68 are preferably Electrical Metallic Tube conduits such as galvanized steel, 2 inch outside diameter, although other sizes and materials can be used if needed to accommodate the particular size of cable 90, with any terminal or connection features, so that the ends of the cable 90 can pass through the inside of the metal conduit 68 with minimal clearance. The metal conduits 68 provide for secure placement of the intumescent sealing putty 74 to seal around the cable(s) 90 that pass through the conduits 68 at the sleeved penetrations 70. In some situations, the cables 90 may be run within cabling conduits; such arrangement may be required by various local codes and regulations. The conduits extending from the cabinet outer shell 26 may be connected to such cabling conduits.

Figure 5A:
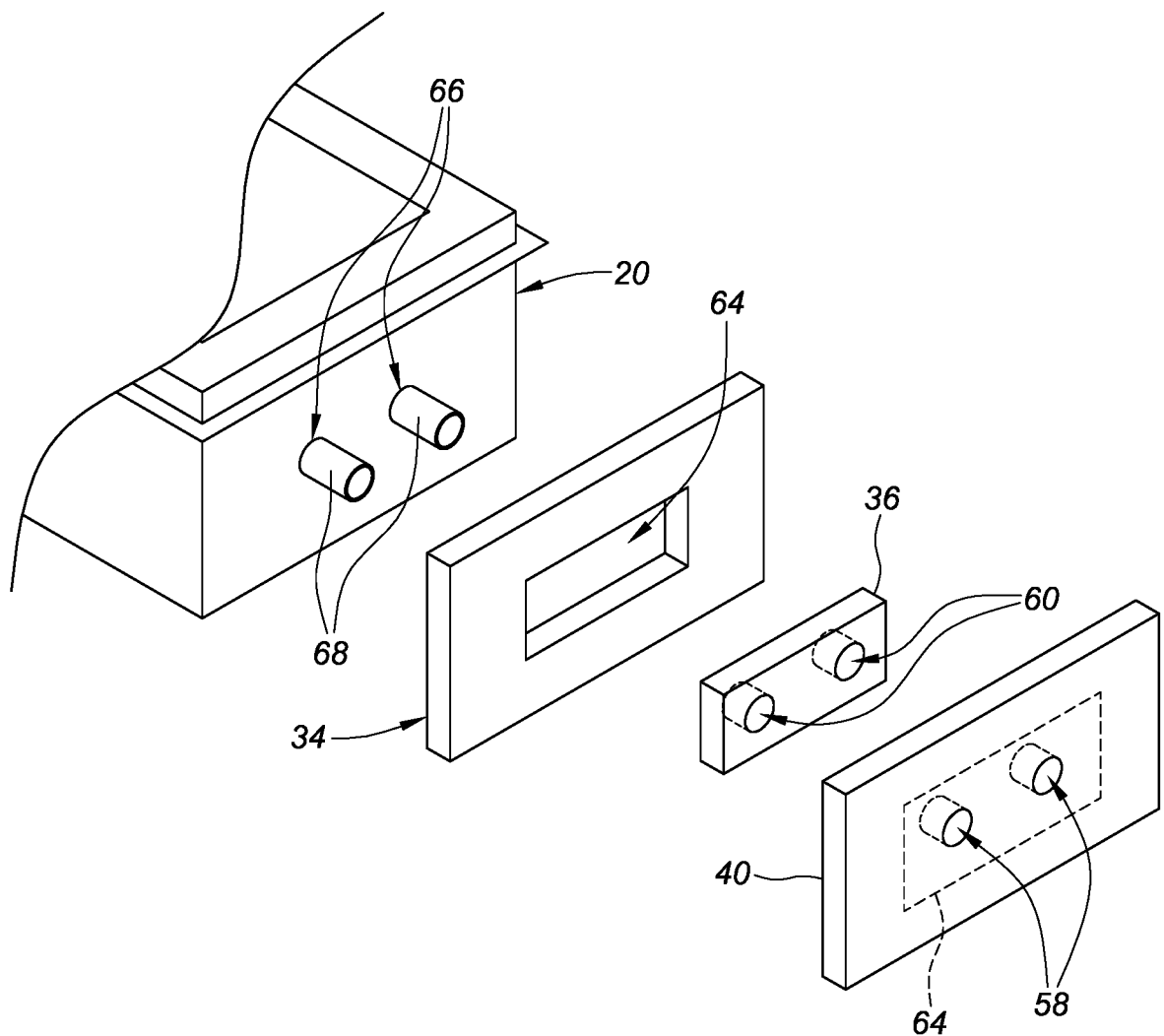
FIG. 5A is a view illustrating a fire-resistive layer with an aperture for the sleeve of a sleeved penetration.

At the locations of the sleeved penetrations 70, apertures 64 (FIG. 5A) are formed in the fire-resistive layers 34 and apertures 58 are formed in the fire resistive panel 40. It can be difficult to form the apertures 64 in the fire-resistive layer 34 in a controlled manner to minimize any gap between the fire-resistive layer 34; the apertures 64 are preferably formed in a larger rectangular shape. In order to minimize any gap at the fire-resistive layer 34, a fire-resistive block 36, in which apertures 60 can more easily be formed in a preferably circular shape, is preferably used to minimize any gaps and heat ingress at the location of the sleeved penetrations 70, and located at the apertures 64. The fire-resistive block 36 is preferably a calcium silicate material such as Thermo-1200 HP Block calcium silicate insulation (Johns Manville, Denver, CO). The fire-resistive block 36 is preferably sized to closely fit the apertures 64; for example, locations of single sleeved penetration 70 preferably have apertures 64 that are about 4 inches by about 4 inches, and locations having two sleeved penetrations 70 preferably have apertures 64 which are about 4 inches by about 8 inches, and so forth, with the respective fire-resistive block 36 preferably sized about 4 inches by 4 inches, 4 inches by 8 inches, and so forth, so that the fire-resistive block 36 fits the respective apertures 64 closely. At the locations of the sleeved penetrations 70, apertures 62 are formed in the mineral board 38; the apertures 62 are preferably circular. In some embodiments, rectangular apertures 64 can be formed in the fire-resistant panel 40 and the mineral block 36 extends through the rectangular apertures 64 in the mineral block 36, rather than forming circular apertures 58 in the fire-resistant panel 40; the location of the rectangular aperture 64 in the mineral block 36 is indicated in dashed lines on FIG. 5A. The various apertures 64, 66, and 58, 60, 62, when any of the respective fire-resistive panel 40, fire-resistive block 36, and mineral board 38 are present, are preferably aligned to form a cabinet aperture for passage of the cable into the electrical enclosure 10. The cabinet aperture and the metal conduit 68 extending outward from the cabinet outer shell 26 together form a sleeved penetration Preferably, the sleeved penetration also includes the metal conduit 68 extending inward from the cabinet inner shell 24.

Figure 5B:
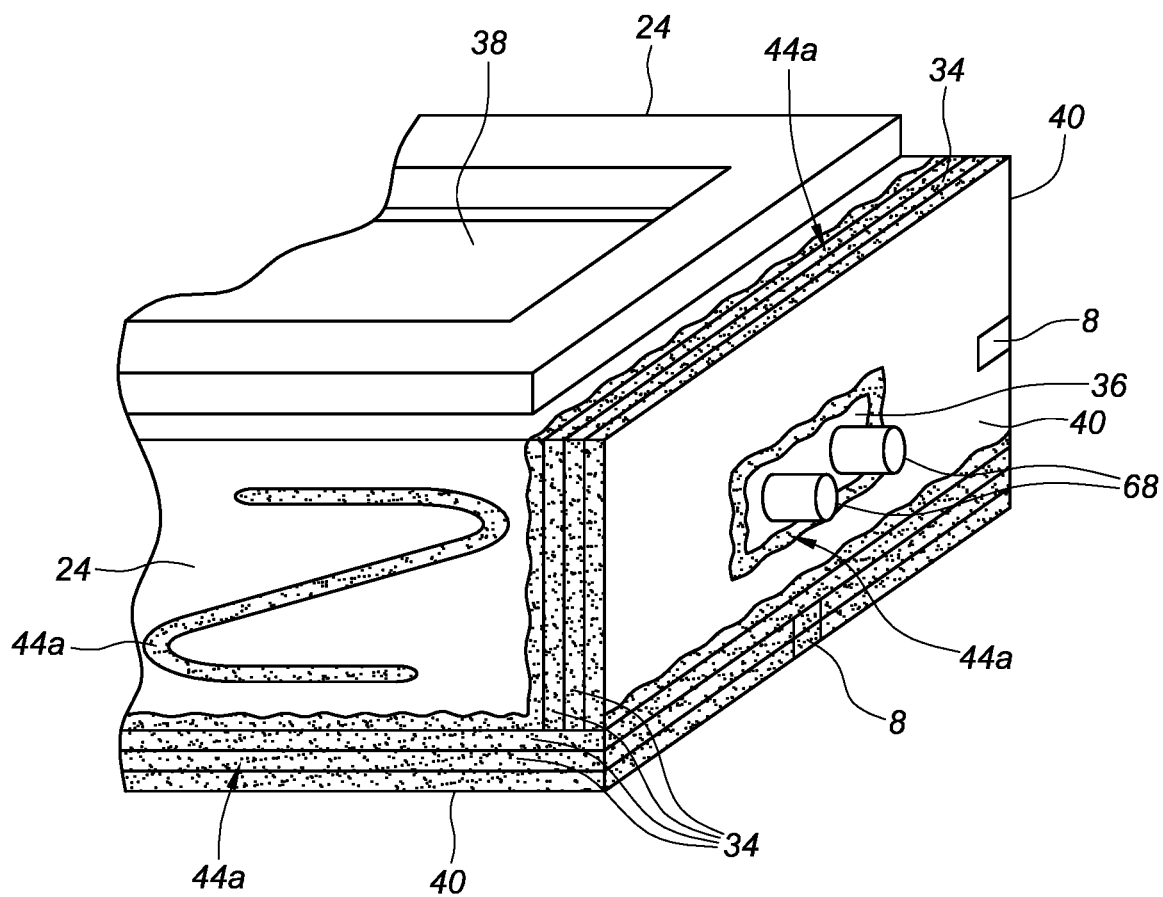
FIG. 5B is an illustration of an intermediate assembly of fire-resistive layers of the cabinet of electrical enclosure of FIG. 1, with some of the fire-resistive layers, fire-resistive panels and fire-resistive block in place outside the cabinet inner shell, and showing thixotropic sealant applied to seal around the fire-resistive block and cover edges and corners of the fire-resistive layer, with a layer of mineral board partially visible inside the inner shell of the cabinet.

The fire-resistive layers 34 are sized and located to cover all surfaces of the cabinet 20, with the exception of the locations of the sleeved penetrations 70, as illustrated in FIG. 5B, which shows an intermediate assembly of fire-resistive layers 34 of the cabinet 20 of electrical enclosure 10, with the cabinet inner shell 24 partially hidden inside the fire-resistive layers 34. The conduits 68 illustrated in FIG. 5B are placed temporarily and used to temporarily maintain alignment of the fire-resistive layers 34 and the fire-resistive block 36 with the apertures 66 during assembly and will be removed prior to placing the cabinet outer shell 26 onto the assembly.

The fire-resistive layer 34, fire-resistive block 36, fire-resistive panel 40, and mineral board 38 are arranged to minimize any gaps between those components, and between those components and the cabinet case 22 and the lid case 52, and between those components and the cables 90 at the sleeved penetrations 70, in order to minimize heat ingress into the electrical enclosure 10 and minimize any fire damage to the cable junction(s) 92 protected within the electrical enclosure 10. Configuring the electrical enclosure components to reduce seams, such as by utilizing single pieces of fire-resistive layer 34, for example, rather than laying up separate pieces of fire-resistive layer 34 within a layer of the layered structure 12 is preferred. If seams are present, any seams should be staggered so that a seam in a fire-resistive layer 34 is not adjacent to a seam in another adjacent fire-resistive layer 34. In order to further minimize heat ingress and fire damage, various sealing elements are preferably located to fill or cover any gaps between components. For example, an intumescent acrylic sealant 44b, such as Flamebar Intumescent Fire Acrylic Sealant (Firespray International Limited, Harlow, Essex, UK) is preferably applied to all seams and corners of the cabinet case 22 and the lid case 52, including any spot-welded joints or seams. A thixotropic sealant 44a, such as 3M Fire Block FB136 (3M, St. Paul, MN) is preferably used to adhere the fire-resistive layer 34 to the cabinet inner shell 24, the fire-resistive layer 34 to the lid inner shell 54, and layers of fire-resistive layer 34 to each other. The thixotropic sealant 44a is preferably applied in a ½-inch bead in a "Z" pattern on the fire-resistive layer 34 to secure the fire-resistive layer 34. Temperature resistant tape 8, such as Polyken 339 Premium Foil Tape (Berry Global, Evansville, IN) is preferably utilized to provide temporary securement of fire-resistive layers 34 during assembly until the thixotropic sealant 44a is cured. The thixotropic sealant 44a is preferably applied around the outside of the fire-resistive block 36 to seal between the fire-resistive block 36 and the fire-resistive layer 34 at the aperture 34. Preferably, the edges and corners of the fire-resistive layer 34 are coated with the thixotropic sealant 44a also, as indicate by the cross-hatched areas in FIG. 5B, to seal these areas to reduce potential heat ingress into the electrical enclosure 10, and to prevent water vapor from passing out of the edges of the fire-resistive layer 34.

Preferably, a layer of fire-resistive panel 40 is located outside the outermost fire-resistive layer 34. At locations of the sleeved penetrations 70, the fire-resistive panel 40 preferably has apertures 58 aligned with the apertures 60 in the fire-resistive block 36. The fire-resistant panel 40 preferably has thixotropic sealant 44a applied to adhere the fire-resistant panel 40 to the fire-resistive layer 34 and to seal the seam where the fire-resistant panel 40 meets the fire-resistive block 36 at the locations of the sleeved penetrations 70. The temperature-resistant tape 8 is preferably applied to secure the fire-resistant panel 40 in place during curing of the thixotropic sealant 44a.

After the thixotropic sealant 44a has cured and the subassembly is stable, the cabinet outer shell 26 is installed and secured to the cabinet inner shell 24, preferably by welding and/or riveting, with the various layers and elements contained between the cabinet inner shell 24 and the cabinet outer shell 26 as illustrated and described herein, and any seams are preferably sealed with intumescent acrylic sealant 44b.

A layer of mineral board 38 is preferably located inside the cabinet 20, and adhered to the cabinet inner shell 24 by thixotropic sealant 44a. Preferably, a layer of mineral board 38 is similarly located on the lid 50, so that all six sides of the fully assembled electrical enclosure 10 have a layer of mineral board.

Figure 6:
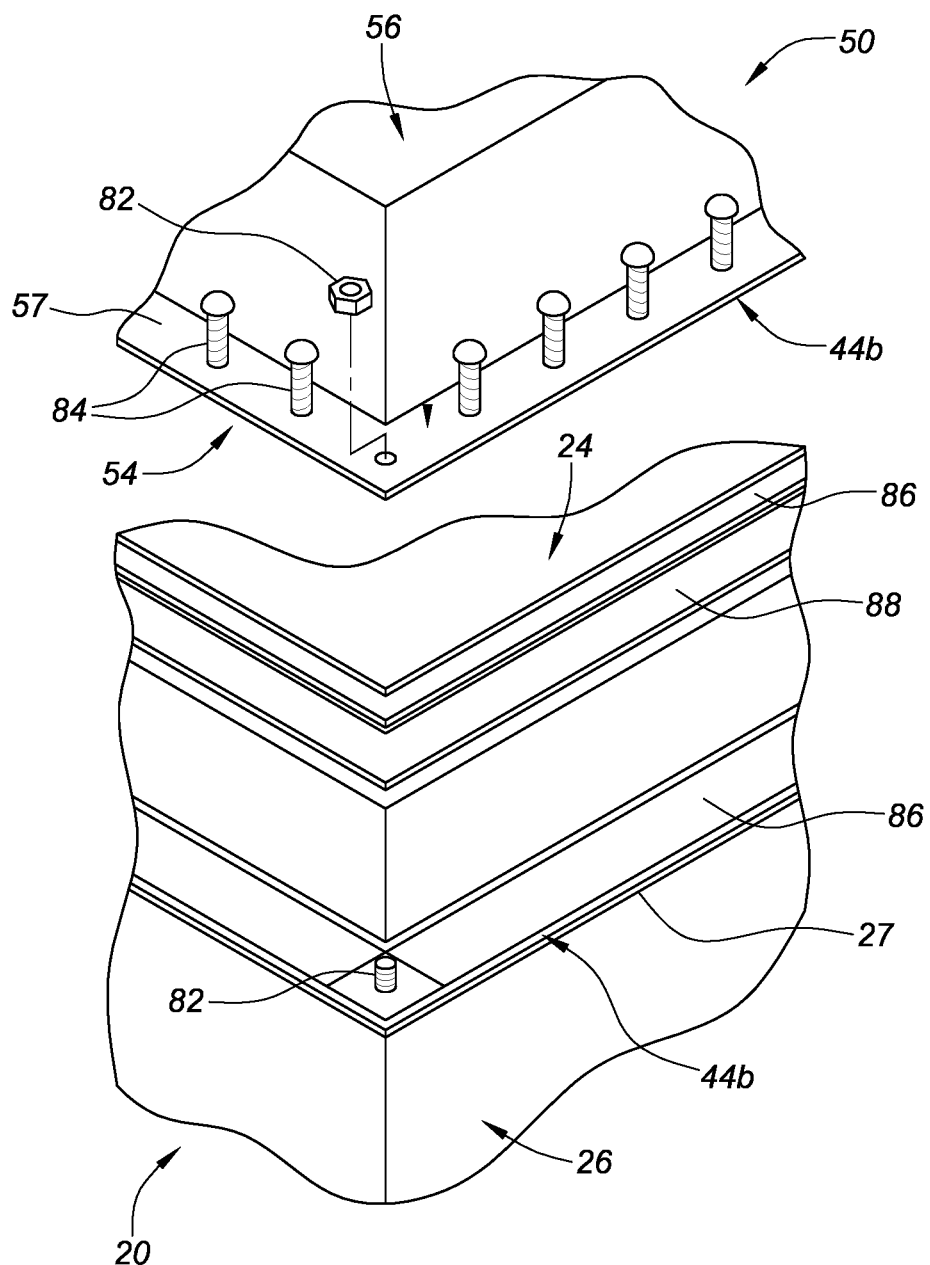
FIG. 6 is a perspective view illustrating the lid to cabinet interface structure of the electrical enclosure of FIG. 1.

The lid 50 is preferably removably attached, or removably coupled, to the cabinet 20 by corner fasteners 82, which preferably include bolts and nuts, and by perimeter fasteners 84, which preferably include sheet metal screws. The structure of the interface between the lid 50 and the cabinet 20 is important, so that a user can access the interior of the cabinet to install the cables 90 and form the cable junctions 92 within the cabinet, secure the lid 50 the cabinet 20 while maintaining an effective seal against heat and fire damage, and yet the lid 50 can be removed by the user to maintain or modify the cable junctions 92 as needed. A preferred arrangement is illustrated in an exploded perspective view of a portion of the electrical enclosure 10 in FIG. 6, and includes fiber gasket 86 arranged between the cabinet flange 27 and the lid flange 57 that are secured to each other by corner fasteners 82 and perimeter fasteners 84. The preferred arrangement also includes an intumescent tape gasket 88 and fiber gasket 86 as illustrated. Preferably, a fiber gasket 86 such as Flamebar 20 mm×5 mm (Firespray International Limited, Harlow, Essex, UK), an intumescent tape gasket 88 such as 3M Intumescent Tape E-FIS (3M, St. Paul, MN), corner fasteners 82 such as ⅜ inch diameter bolds and corresponding nuts at the four corners of the cabinet flange 27 and the lid flange 57, and perimeter fasteners such as 1.25 inch #10 sheet metal screws spaced about 3 inches apart along the cabinet flange 27 and the lid flange 57 are utilized.

Figure 7:
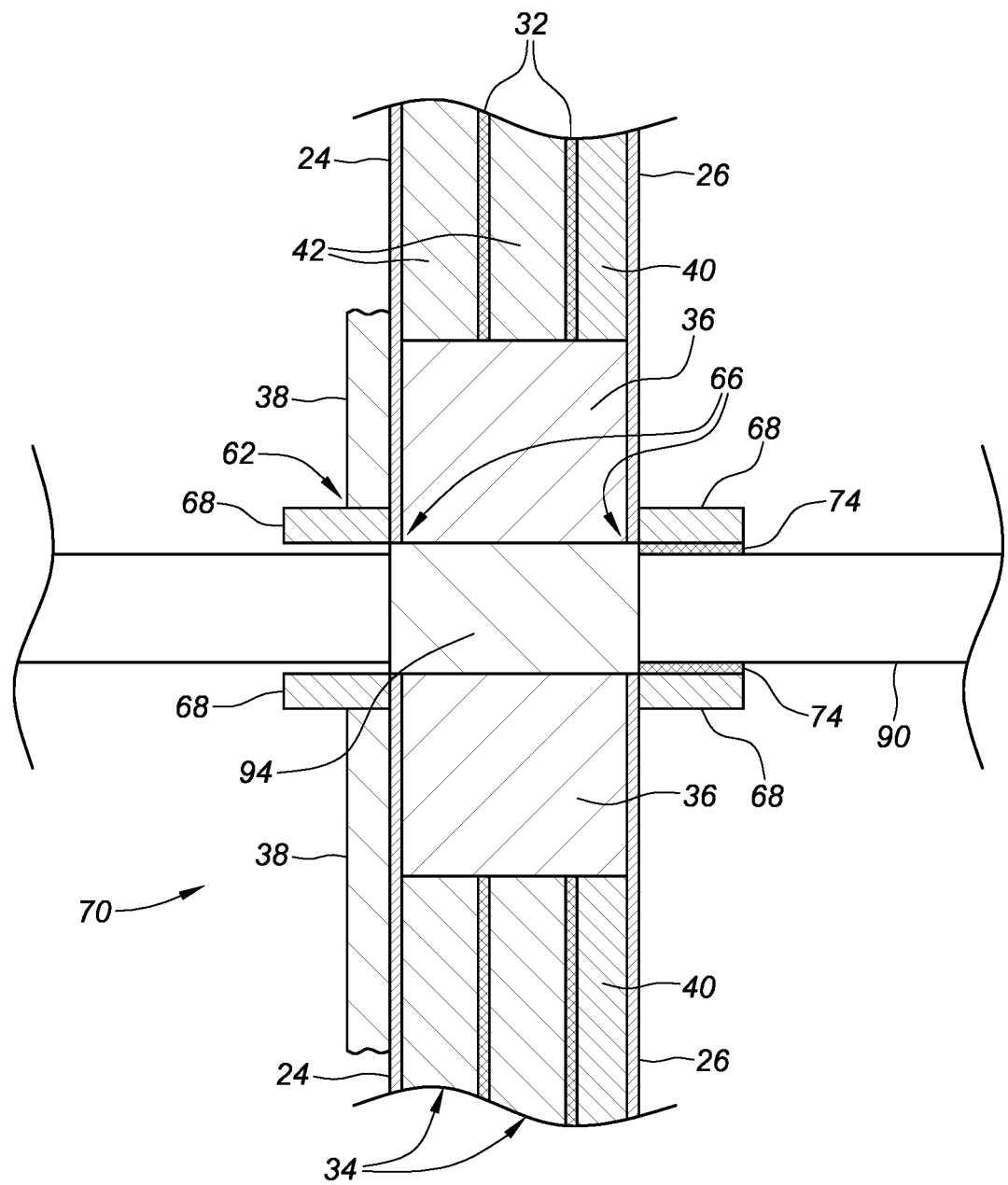
FIG. 7 is a perspective view illustrating the cable penetration sleeve structure of the electrical enclosure of FIG. 1.

In order to maintain an effective seal against heat and fire damage at the sleeved penetrations 70, a preferred arrangement, as illustrated in a partial section view in FIG. 7, includes a protective covering 94, such as 3M Intumescent Tape E-FIS (3M, St. Paul, MN), intumescent sealing putty 74 such as SpecSeal SSP Putty (Specified Technologies, Inc., Somerville, NJ) applied and compressed to fill at least 50% of the depth of the conduit 68 from the inside of the electrical enclosure 10 (at least 0.75 inch) and to fill at least 50% of the depth of the conduit 68 from the outside of the electrical enclosure 10 (at least 1.5 inch). In this preferred arrangement, the fire-resistive block 36 fills space between the fire-resistive layers 34, the fire-resistive panel, the cabinet inner shell 24, the cabinet outer shell 26, and the conduit 68, with minimal space or gaps between these components, and the gaps are preferably sealed with thixotropic sealant 44a, such as 3M Fire Block FB136 (3M, St. Paul, MN). The mineral board 38 is preferably secured to the inside of the cabinet inner shell 24 as illustrated, preferably using thixotropic sealant 44a. As can be seen from FIG. 7, the fire-resistive layers 34, including mineral board 38, are preferably oriented with the cement-based fire-resistant material 32 oriented toward the outside of the electrical enclosure 10.

The electrical enclosure 10 preferably includes at least 3 sleeved penetrations 70. The electrical enclosure 10 more preferably includes 4 sleeved penetrations 70 A user may not require use of all sleeved penetrations 70 in all cases. If a particular installation requires junction between fewer cables 90 than the number of sleeved penetrations 70 provided in the electrical enclosure 10, the unused sleeved penetrations 70 must be plugged, sealed, or otherwise fire stopped to avoid heat and fire damage to the cable junctions 92 within the electrical enclosure 10. When the lid 50 and the cabinet 20 are secured together and sealed as described, and cables 90 are in place at sleeved penetrations 70 and sealed as described, and any unused sleeved penetrations 70 are plugged as described, the electrical enclosure 10 protects the cable junctions 92 inside the electrical enclosure 10 against heat and fire damage during a fire emergency, and the electrical enclosure 10 is preferably sufficiently sealed to also prevent ingress of water from a fire hose during a fire-fighting operation, thereby protecting the cable junctions 92 inside the electrical enclosure from water damage.

As used herein, the terms "inside", "outside", "inner", and "outer" have their normal meaning to indicate location with respect to the electrical enclosure 10. For clarity of presentation, the electrical enclosure 10 is generally described herein as having the lid 50 above the cabinet 20, when the electrical enclosure is oriented upright. In some views elements are shown upside-down for purposes of illustration. These general orientation indications are used herein for clarity of presentation, but are not necessarily intended to be limiting. For example, an electrical enclosure 10 can be oriented with the lid 50 at the bottom, and the cabinet 20 at the top; therefore the term "lid" does not necessarily mean that the element "lid 50" is on top of the cabinet 20. While the arrangements described in detail herein are preferred, some disclosed elements can be oriented differently but within the scope of the present disclosure. For example, sleeved penetration(s) 70 can be located in the lid 50 or on the bottom of the cabinet 20, the fire-resistive layer can be oriented so that the cement-based fire-resistant material is toward the inside of the cabinet 20, the fire-resistive panel 40 could be substituted for the mineral board 38, the fire-resistive panel 40 or the mineral board 38 could be omitted or substituted by a fire-resistive layer 34, blocks of the fire-resistive panel 40 can be substituted for the fire-resistive block 36, and so forth, while keeping with the general teachings of the present disclosure.

One preferred method of fabrication is illustrated in FIG. 8 and includes steps of:
- step 45a—forming case including a cabinet inner shell, a cabinet outer shell, a lid inner shell, and a lid outer shell of corrosion-resistant sheet metal by cutting, bending, riveting, and welding;
- step 45b—forming at least one aperture in the cabinet inner shell and the cabinet outer shell;
- step 45c—sealing seams in the case with an intumescent sealant;
- step 45d—forming at least one fire-resistive layer by coating fibrous mineral insulation with cement-based fire-resistant material;
- step 45f—forming at least one aperture in the fire-resistive layer;
- step 45i—assembling at least one fire-resistive layer to cover the external surface of the cabinet inner shell and adhering with thixotropic sealant, with the aperture in the fire-resistive layer aligned with the aperture in the cabinet inner shell;
- step 45j—sealing the edges of the fire-resistive layer with thixotropic sealant;
- step 45k—placing the cabinet outer shell onto the fire-resistive layer(s), with the aperture in the cabinet outer shell aligned with the aperture in the fire-resistive layer;
- step 45m—welding the cabinet outer shell to the cabinet inner shell to form a cabinet;
- step 45n—welding a corrosion-resistant conduit to the cabinet inner shell so that the conduit extends a short distance outside the cabinet;
- step 45p—sealing seams in the case and between the cabinet outer shell and the conduit with an intumescent sealant;
- step 45q—forming at least one lid fire-resistive layer by coating fibrous mineral insulation with cement-based fire-resistant material;
- step 45s—sealing the edges of the fire-resistive layer with thixotropic sealant;
- step 45t—assembling at least one lid fire-resistive layer to cover the external surface of the lid inner shell and adhering with thixotropic sealant;
- step 45u—placing the lid outer shell onto the lid fire-resistive layer(s);
- step 45v—welding the lid outer shell to the lid inner shell to form a lid, and sealing joints and seams with an intumescent sealant; and
- step 45w—removably securing the lid and the cabinet with fasteners, with fiber gasket and intumescent tape gasket applied where the lid and the cabinet meet to form a fire-resistant enclosure.

Another preferred method of fabrication further as illustrated in FIG. 8 further includes steps of:
- step 45g—cutting a fire-resistive block to fit the aperture in the fire-resistive layer; and
- step 45h—forming at least one aperture in the fire-resistive block.

One preferred method of protecting communication cable junctions of fire-resistant cables and the like during a fire emergency is illustrated in FIG. 9 and includes steps of:
- step 47a—providing a fire-resistant enclosure with a cabinet, a lid, and a sleeved penetration;
- step 47b—applying intumescent tape to the portion of the fire-resistant cables that will pass through the sleeved penetration;
- step 47c—passing the fire-resistant cable through the sleeved penetration and forming at least one junction with the fire-resistant cable within the cabinet using the junction elements;
- step 47d—sealing between the sleeved penetration and the fire-resistant cable with intumescent sealing putty; and
- step 47e—removably securing the lid and the cabinet with fasteners, with fiber gasket and intumescent tape gasket applied where the lid and the cabinet meet to form a fire-resistant enclosure.

One object of the present invention is to provide a fire-resistant enclosure to protect communication cable junctions, cables, connectors, splitters, joints, terminal points and the like during a fire emergency. Another object of the present invention is provide a fire-resistant enclosure that can be opened for maintenance or modification of junction components and can be subsequently closed in a manner that maintains the fire-resistance of the enclosure, without destroying, modifying, or re-applying protective materials and without disassembly that would require to re-installation and re-inspection. Yet another object of the invention is to provide a fire-resistant enclosure that is compliant with various building code, fire code, UL, and other regulatory or standards entities. An additional object of the invention is to provide a fire-resistant enclosure that maintains a temperature below 180° C., and preferably below 120° C. for at least 2 hours during a fire emergency in order to protect cables, connectors, splitters, joints, and terminal points. Still another object of the invention is to provide a fire-resistant enclosure that provides for straightforward installation, maintenance, and reconfiguration procedures. A further object of the invention is to provide efficient methods of fabrication of a fire-resistant enclosure. A still further object of the invention is to provide efficient methods of protecting communication cables and equipment so that they can be operational during a fire emergency. A further additional object of the invention is to provide a fire-resistant enclosure that can be secured to a floor, wall, or ceiling, or to any fire-rated structure, with the enclosure providing fire resistance from any or all of the sides, top, and bottom of the enclosure.

In some embodiments, the invention includes an electrical enclosure for protection of cable junctions during a fire emergency, including a cabinet and a lid that is removably attachable to the cabinet, each with a shell including an inner shell and an outer shell and fire-resistant layers within the shell, with the cabinet having at least one cabinet aperture extending through the shell and the fire-resistant layers. In some embodiments, the shell of the electrical enclosure includes more than one outer shell walls and more than one inner shell walls, and at least one of the fire-resistant layers is adjacent to each of the inner shell walls and at least one of the fire-resistant layers is adjacent to each of the outer shell walls. In some embodiments, the electrical enclosure includes layers of mineral board adhered the interior of each of the inner shell walls by a thixotropic sealant. In some embodiments, at least one of the fire-resistive layers includes a fire-resistive sheathing with a cement-based fire-resistant material on an outer surface of the fire-resistive layer, and is located between inner shell walls and the outer shell. In some embodiments, the electrical enclosure of includes layer of a material within the cabinet that is configured to release water or steam during a high temperature event, and wherein cement-based fire-resistant material on the outer surface of the fire-resistive layer reduces the escape of steam from the cabinet.

In some embodiments, at least one of the heat-resistive layers between the inner shell and the outer shell is adhered to the inner shell by a thixotropic sealant. In some embodiments, at least one of the fire-resistive layers has an end and has a cement-based fire-resistant material on an outer surface and on the end. In some embodiments, the cabinet aperture through the fire-resistive layer has a fire-resistive block sized and configured to fill the fire-resistive layer aperture, and the fire-resistive block has an aperture aligned with the cabinet aperture through the inner and outer shells. In some embodiments, the shell is metal, and the electrical enclosure includes a metal conduit attached to the shell at the cabinet aperture, and the cabinet aperture and the conduit form a sleeved penetration. In some embodiments, the electrical enclosure includes a thixotropic gasket between the cabinet and the lid when the lid is attached to the cabinet. In some embodiments, the electrical enclosure includes more than one cabinet aperture.

In some embodiments, the electrical enclosure includes a layer of fire-resistant panel adhered to an outside of at least one of the fire-resistive layers by a thixotropic sealant. In some embodiments, the electrical enclosure is configured to provide protection of the cable junctions inside the closed electrical enclosure by maintaining an interior temperature no greater than 180° C. when the electrical enclosure is exposed to a fire emergency with temperatures up to 1850° F. for at least 2 hours. In some embodiments, the electrical enclosure is configured to prevent ingress of water from a fire hose during a fire-fighting operation. In some embodiments, the electrical enclosure includes an outer shell with more than one outer shell walls, an inner shell with more than one inner shell walls, with a fire resistive panel adjacent each of the outer shell walls, and having a first fire-resistive layer interior of each of the fire resistive panels and a second fire-resistive layer interior of each of the first fire-resistive layers and adjacent to one of the inner shell walls, and a layer of mineral board adhered to the inside of each of the inner shell walls.

In some embodiments, the invention includes a method of manufacturing an electrical enclosure for protection of cable junctions during a fire emergency, including steps of forming a case including an inner cabinet, an outer cabinet, an inner lid, and an outer lid of corrosion-resistant sheet metal, forming at least one aperture in the inner cabinet and the outer cabinet, sealing seams in the case with an intumescent sealant, forming at least one fire-resistive layer by coating fibrous mineral insulation with cement-based fire-resistant material, cutting the fire-resistive layer to a size consistent with the inner cabinet and the outer cabinet forming at least one aperture in the fire-resistive layer cutting a fire-resistive block to fit the aperture in the fire-resistive layer and forming at least one aperture in the fire-resistive block, assembling the at least one fire-resistive layer to cover an external surface of the inner cabinet and adhering with thixotropic sealant with the aperture in the fire-resistive layer aligned with the aperture in the inner cabinet, sealing edges of the fire-resistive layer with thixotropic sealant, placing the outer cabinet onto the fire-resistive layer(s) with the aperture in the outer cabinet aligned with the aperture in the fire-resistive layer, welding the outer cabinet to the inner cabinet to form a cabinet, welding a corrosion-resistant conduit to the inner cabinet so that the conduit extends a short distance inside the cabinet and welding a corrosion-resistant conduit to the outer cabinet so that the conduit extends a short distance outside the cabinet to form a sleeved penetration, sealing seams in the case and between the inner cabinet and the conduit and the outer cabinet and the conduit with an intumescent sealant, forming at least one lid fire-resistive layer by coating fibrous mineral insulation with cement-based fire-resistant material, cutting the lid fire-resistive layer to a size consistent with the inner lid and the outer lid, sealing the edges of the fire-resistive layer with thixotropic sealant, assembling at least one lid fire-resistive layer to cover the external surface of the inner lid and adhering with thixotropic sealant, placing the outer lid onto the lid fire-resistive layer(s), welding the outer lid to the inner lid to form a lid, and sealing joints and seams with an intumescent sealant, and removably securing the lid and the cabinet with fasteners, with fiber gasket and intumescent tape gasket applied where the lid and the cabinet meet, to form a fire-resistant enclosure.

In some embodiments, the invention includes a method of protecting cable junctions and the like during a fire emergency, including steps of providing a fire-resistant enclosure with a lid and a cabinet and a sleeved penetration, applying intumescent tape to a portion of a fire-resistant cable that will pass through the sleeved penetration, passing the fire-resistant cable through the sleeved penetration and forming at least one junction with the fire-resistant cable within the cabinet using junction elements, sealing between the sleeved penetration and the fire-resistant cable with intumescent sealing putty, securing the lid and the cabinet with fasteners, with fiber gasket and intumescent tape gasket applied where the lid and the cabinet meet, to form a fire-resistant enclosure, and using the sleeved penetration with the intumescent sealing putty between the fire-resistant cable and the aperture in the fire-resistive block to minimize heat transfer into an interior during a fire emergency.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An electrical enclosure for protection of cable junctions during a fire emergency, the electrical enclosure comprising:
a cabinet comprising a cabinet inner shell, a cabinet outer shell, at least one cabinet aperture, and a plurality of cabinet fire-resistive layers, wherein the plurality of cabinet fire-resistive layers are between the cabinet inner shell and the cabinet outer shell, and wherein the cabinet aperture extends through the cabinet inner shell, the cabinet outer shell and at least one of the plurality of cabinet fire-resistive layers; and a lid comprising a lid inner shell, a lid outer shell, and at least one lid fire-resistive layer, wherein the at least one lid fire resistive layer is between the lid inner shell and the lid outer shell, wherein the cabinet and the lid are removably coupled.

2. The electrical enclosure according to claim 1, wherein the cabinet outer shell comprises a plurality of outer shell walls and the cabinet inner shell comprises a plurality of inner shell walls, and wherein at least one of the plurality of cabinet fire-resistive layers is adjacent to each of the plurality of inner shell walls and the plurality of outer shell walls.

3. The electrical enclosure of claim 2, further comprising a plurality of layers of a first mineral board adhered to each of the walls of the cabinet inner shell by a thixotropic sealant, and a layer of a second mineral board adhered to the lid inner shell by a thixotropic sealant.

4. The electrical enclosure according to claim 3, wherein at least one of the plurality of cabinet heat-resistive layers comprising a fire-resistive sheathing with a cement-based fire-resistant material on an outer surface of the fire-resistive layer is disposed between each of the walls of the cabinet inner shell and the cabinet outer shell.

5. The electrical enclosure according to claim 1, wherein at least one of the plurality of cabinet heat-resistive layers comprises a fire-resistive sheathing with a cement-based fire-resistant material on an outer surface of the fire-resistive layer.

6. The electrical enclosure of claim 5, further comprising a layer of a material within the cabinet that is configured to release water or steam during a high temperature event, and wherein the cement-based fire-resistant material applied to the fire-resistive layer reduces the escape of steam from the cabinet.

7. The electrical enclosure according to claim 1, wherein at least one of the plurality of cabinet heat-resistive layers is adhered to the cabinet inner shell by a thixotropic sealant.

8. The electrical enclosure according to claim 1, wherein at least one of the plurality of cabinet fire-resistive layers comprises an end, and wherein a cement-based fire-resistant material is disposed on an outer surface and the end of the at least one fire-resistive layer.

9. The electrical enclosure according to claim 1, wherein the cabinet aperture defines a fire-resistive layer aperture, and further comprising a fire-resistive block sized and configured to fill the fire-resistive layer aperture.

10. The electrical enclosure according to claim 1, further comprising a metal conduit extending outward from the cabinet outer shell.

11. The electrical enclosure according to claim 10, wherein the cabinet aperture and the metal conduit form a sleeved penetration.

12. The electrical enclosure according to claim 1, wherein the at least one lid fire-resistive layer is adhered to the lid inner shell by a thixotropic sealant, and wherein the at least one lid fire-resistive layer comprises a fire-resistive sheathing with a cement-based fire-resistant material on an outer surface of the fire-resistive layer.

13. The electrical enclosure according to claim 1, further comprising a thixotropic gasket between the cabinet and the lid when the lid is coupled to the cabinet.

14. The electrical enclosure according to claim 1, wherein the at least one cabinet aperture comprises a plurality of cabinet apertures.

15. The electrical enclosure of claim 1, further comprising a layer of fire-resistive panel adhered to an outside of at least one of the plurality of cabinet fire-resistive layers by a thixotropic sealant, and a layer of fire-resistive panel adhered to the outside of at least one of the at least one lid fire resistive layer by a thixotropic sealant.

16. The electrical enclosure of claim 1, wherein the electrical enclosure is configured to provide protection of the cable junctions by maintaining an interior temperature no greater than 180° C. when the electrical enclosure is exposed to a fire emergency with temperatures up to 1850° F. for at least 2 hours.

17. The electrical enclosure of claim 1, wherein the electrical enclosure is configured to prevent ingress of water from a fire hose during a fire-fighting operation.

18. The electrical enclosure of claim 1, wherein the cabinet outer shell comprises a plurality of outer shell walls, the cabinet inner shell comprises a plurality of inner shell walls, wherein the cabinet comprises a fire resistive panel adjacent each of the plurality of outer shell walls, wherein the cabinet further comprises a first fire-resistive layer interior of each of the fire resistive panels, a second fire-resistive layer interior of each of the first fire-resistive layers, one of the plurality of inner shell walls adjacent to each of the second fire resistive layers, and a layer of mineral board adhered internal to each of the plurality of inner shell walls.

19. A method of manufacturing an electrical enclosure for protection of cable junctions during a fire emergency, the method comprising the steps of:

forming a case including an inner cabinet, an outer cabinet, an inner lid, and an outer lid of corrosion-resistant sheet metal by cutting, bending, riveting, and welding;

forming at least one aperture in the inner cabinet and the outer cabinet;

sealing seams in the case with an intumescent sealant; forming at least one fire-resistive layer by coating fibrous mineral insulation with cement-based fire-resistant material;

cutting the fire-resistive layer to a size consistent with the inner cabinet and the outer cabinet; forming at least one aperture in the fire-resistive layer;

cutting a fire-resistive block to fit the aperture in the fire-resistive layer and forming at least one aperture in the fire-resistive block;

assembling the at least one fire-resistive layer to cover an external surface of the inner cabinet and adhering with thixotropic sealant, with the aperture in the fire-resistive layer aligned with the aperture in the inner cabinet;

sealing edges of the fire-resistive layer with thixotropic sealant;

placing the outer cabinet onto the fire-resistive layer(s), with the aperture in the outer cabinet aligned with the aperture in the fire-resistive layer; welding the outer cabinet to the inner cabinet to form a cabinet;

welding a corrosion-resistant conduit to the inner cabinet so that the conduit extends a short distance inside the cabinet, and welding a corrosion-resistant conduit to the outer cabinet so that the conduit extends a short distance outside the cabinet, forming a sleeved penetration;

sealing seams in the case and between the inner cabinet and the conduit and the outer cabinet and the conduit with an intumescent sealant;

forming at least one lid fire-resistive layer by coating fibrous mineral insulation with cement-based fire-resistant material;

cutting the lid fire-resistive layer to a size consistent with the inner lid and the outer lid;

sealing the edges of the fire-resistive layer with thixotropic sealant; assembling at least one lid fire-resistive layer to cover the external surface of the inner lid and adhering with thixotropic sealant; placing the outer lid onto the lid fire-resistive layer(s);

welding the outer lid to the inner lid to form a lid, and sealing joints and seams with an intumescent sealant; and removably securing the lid and the cabinet with fasteners, with fiber gasket and intumescent tape gasket applied where the lid and the cabinet meet to form a fire-resistant enclosure.

20. A method of protecting cable junctions and the like during a fire emergency, the method comprising the steps of:

providing a fire-resistant enclosure with a lid, a cabinet, and a sleeved penetration;

applying intumescent tape to a portion of a fire-resistant cable that will pass through the sleeved penetration;

passing the fire-resistant cable through the sleeved penetration and forming at least one junction with the fire-resistant cable within the cabinet using junction elements;

sealing between the sleeved penetration and the fire-resistant cable with intumescent sealing putty;

securing the lid and the cabinet with fasteners, with fiber gasket and intumescent tape gasket applied where the lid and the cabinet meet to form a fire-resistant enclosure; and using the sleeved penetration, with the intumescent sealing putty between the fire-resistant cable and the aperture in the fire-resistive block to minimize heat transfer into an interior during a fire emergency.

* * * * *